US008023029B2

(12) United States Patent
Joseph

(10) Patent No.: US 8,023,029 B2
(45) Date of Patent: Sep. 20, 2011

(54) DIGITAL CAMERA-PROJECTOR HYBRID

(75) Inventor: Daniel M. Joseph, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 509 days.

(21) Appl. No.: 12/098,703

(22) Filed: Apr. 7, 2008

(65) Prior Publication Data

US 2009/0251585 A1 Oct. 8, 2009

(51) Int. Cl.
*H04N 5/222* (2006.01)
(52) U.S. Cl. .................................. 348/333.01
(58) Field of Classification Search ............. 348/333.01, 348/373, 744, 333.1; 354/219; 358/224
See application file for complete search history.

(56) References Cited

U.S. PATENT DOCUMENTS

| 5,283,600 | A | | 2/1994 | Imai |
| 5,300,976 | A | | 4/1994 | Lim et al. |
| 5,315,334 | A | * | 5/1994 | Inana ........................... 396/374 |
| 5,483,285 | A | | 1/1996 | Lim et al. |
| 5,528,297 | A | | 6/1996 | Seegert et al. |
| 5,726,632 | A | * | 3/1998 | Barnes et al. ................. 340/577 |
| 6,608,614 | B1 | | 8/2003 | Johnson |
| 7,116,361 | B2 | | 10/2006 | Baron |
| 7,312,779 | B1 | | 12/2007 | Blevins |
| 6,830,345 | B2 | | 4/2008 | Kamm et al. |
| 7,500,758 | B1 | * | 3/2009 | Adachi et al. ................. 353/101 |

| 2002/0113912 | A1 | 8/2002 | Wright et al. |
| 2002/0176015 | A1 | 11/2002 | Lichtfuss |
| 2007/0273848 | A1 | 11/2007 | Fan et al. |

FOREIGN PATENT DOCUMENTS

| EP | 1387211 A1 | 4/2004 |
| JP | 6118337 A | 4/1994 |

OTHER PUBLICATIONS

PCT International Search Report, PCT/US2009/039171, Oct. 29, 2009, European Patent Office.

* cited by examiner

*Primary Examiner* — David Ometz
*Assistant Examiner* — Akshay Trehan
(74) *Attorney, Agent, or Firm* — Marsh Fischmann & Breyfogle LLP; Kent A. Lembke

(57) ABSTRACT

A camera-projector assembly for viewing captured images in a near-view mode and in a distal-view projection mode. The assembly includes a camera housing and an image capture assembly within the housing collecting image data. The camera-projector assembly includes a projection assembly mounted on the camera housing that includes a projection lens and a projection light source. A transmissive display such as an LCD is provided external to the camera housing and adapted to be positionable in a first position proximate to the camera housing and in a second position between the projection lens and light source. The transmissive display is positionable against an external surface of the camera housing when it is in the first position and at least partially spaced apart from the external surface in the second position. The transmissive display may be rotated or slid from the first to the second position on the camera housing.

18 Claims, 15 Drawing Sheets

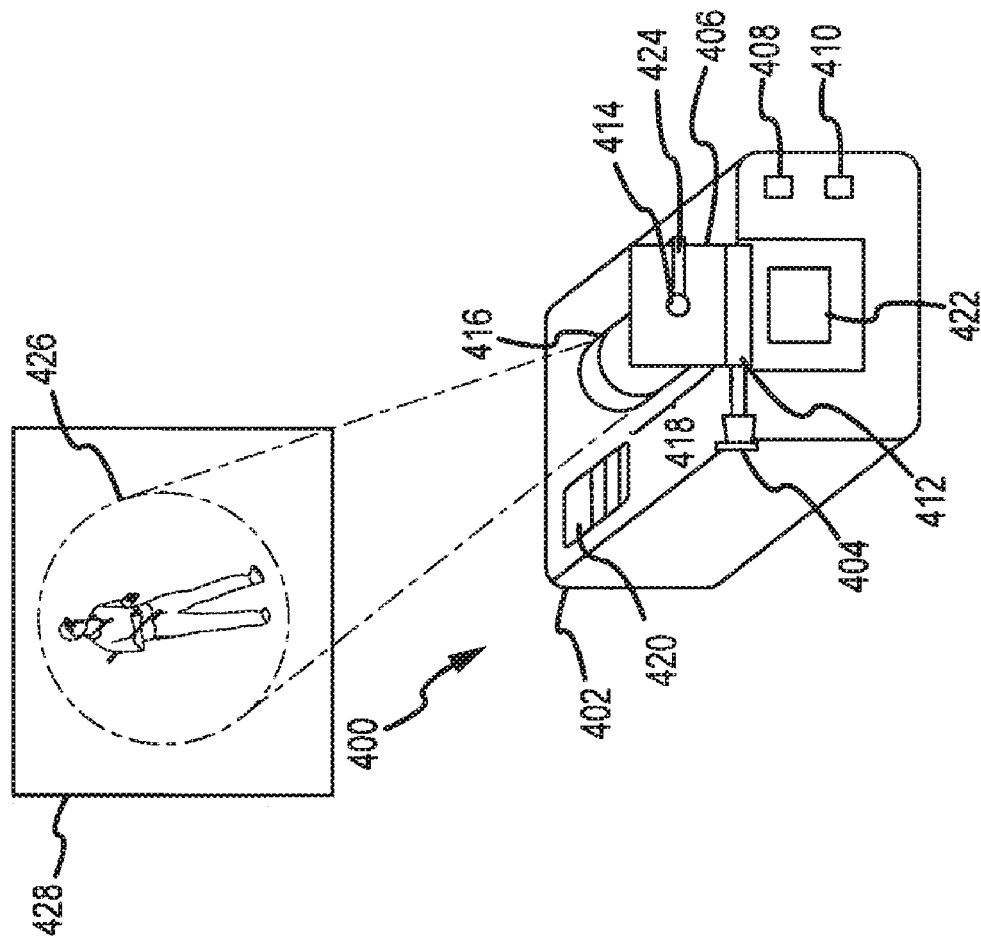
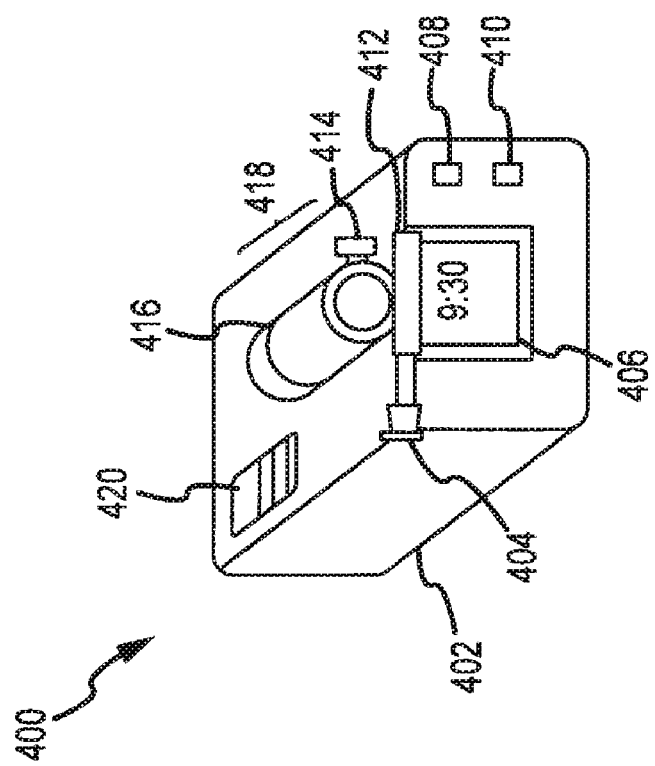
FIG. 4B
FIG. 4A

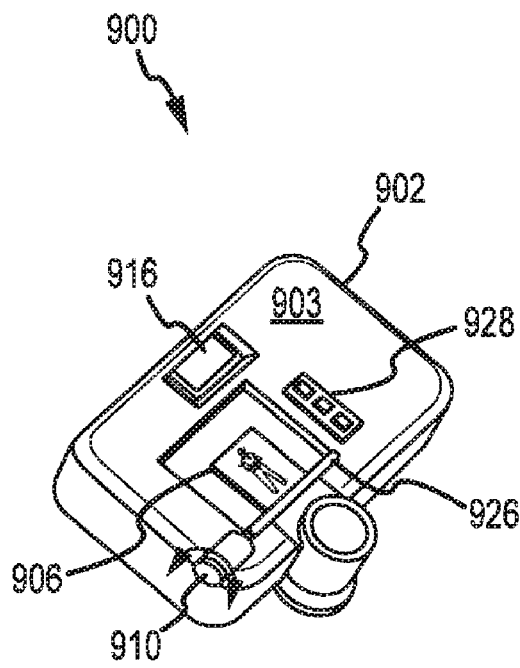
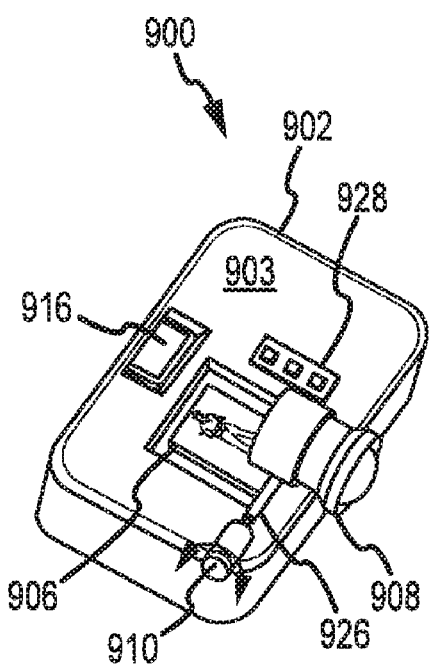
FIG.9A  FIG.9B
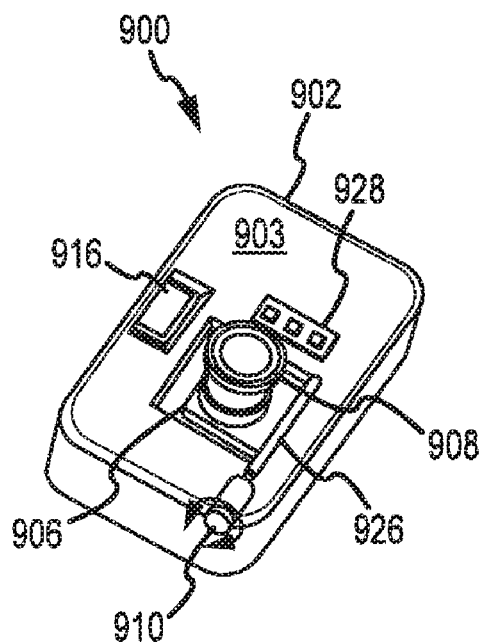
FIG.9C

DIGITAL CAMERA-PROJECTOR HYBRID

BACKGROUND OF THE INVENTION

The present invention generally relates to portable display devices, and more particularly, to portable display devices that can operate in both near-view and projection modes, which enables the devices to be used as both individual displays and multiple-viewer displays.

Generally, cameras are equipped with some type of viewfinder that operates to enable a user to view the scene that will be captured by the lens of the camera. In some cameras, this viewfinder may be something as simple as a port through the camera that allows the user to visualize the approximate boundaries of the image to be captured. In this regard, the user is then able to substantially determine beforehand what the resulting picture will look like. However, as can be appreciated, these ports do not permit the user to subsequently view the resulting image after the camera has taken a picture.

With the invention of digital cameras, manufacturers began including small electronic displays to allow users to view the image to be captured, and to subsequently view or playback previously captured images and/or videos. Rather than conventional cathode ray tube (CRT) displays, digital cameras typically utilize transmissive displays due to their relatively greater luminance, higher contrast ratios, greater sharpness, and better spatial uniformity. Generally, transmissive displays utilize a light source, often termed a backlight, to illuminate pixels on a flat, transmissive panel. Light intensity from the backlight may be maintained at a constant level, and color may be provided by the relative luminosity of the light transmitted through three primary color filters, usually selected as red, green, and blue, associated with each pixel on the panel. One example of transmissive display systems is Liquid Crystal Display (LCD) devices. An LCD is a thin, flat display device made up of any number of color or monochrome pixels arrayed in front of a light source, such as a digital camera's backlight. LCD's are often utilized in battery-powered electronic devices, such as digital cameras, because they use relatively small amounts of electric power, are small in size and weight, and have reduced glare.

Typically, a digital camera includes an LCD screen affixed in the camera body. For example, the LCD screen may be affixed in a back wall of the camera body. In this regard, a user may preview the image to be captured, view stored images, and operate various menus on the digital camera. The LCD device may generally have a diagonal dimension of about one to four inches. As can be appreciated, these LCD devices may have disadvantages. First, only one person can easily monitor the image of the object being framed or previously framed through the viewfinder in the digital camera. That is, several people cannot simultaneously monitor the image of the object presently or previously framed since the display is quite small (e.g., 1-4 inches diagonal). Second, although many digital cameras provide features that enable them to be connected to an external display (e.g., a television, monitor, or external projector), it may be inconvenient to connect a digital camera to an external display when many persons are to simultaneously view the image or video shot by the digital camera.

Some efforts have been made to provide a camera that can also project an external display. However, these devices have typically required complex laser systems, costly redesigns, additional external components, and the like. Hence, there remains a strong demand for a dual-purpose digital camera that can both capture still or video images and play them back locally and to groups (e.g., projection).

SUMMARY OF THE INVENTION

The present invention addresses the above and other problems by providing camera-projector combinations or assemblies and other products (such as toys, clock radios, handheld projectors, and the like). These assemblies are adapted to provide relatively inexpensive projectors with readily available transmissive displays such as LCDs. For example, even low-end digital cameras include a small LCD or display screen for viewing images captured with the camera (or provided in modular, attached memory devices). In some preferred embodiments, the camera-projector assembly is created by attaching a projector assembly with a projection light source (such as a white or colored LED of up to 150 lumens or more power) and a projection lens. The LCD is mounted on an external surface of the camera body such that it can be shared or used in a near-view mode in which it is positioned against the camera body/housing and in a projection mode in which it is positioned between the projection light source and the projection lenses. For example, the LCD may be pivotally mounted on the rear or back surface of the camera housing to be rotated between the near-view mode position against the camera housing and the projection mode position spaced apart from the housing surface, with the light source sometimes being positionable against the back of the LCD in this projection mode position.

In other embodiments of the invention, a positionable LCD or other display is shared between one display device (e.g., a near-view display) and a projection assembly. This may be desirable to provide inexpensive projectors such as a projection assembly that may operate when it receives a modular LCD such as found on a keychain or the like. Toys may be fabricated with low priced projectors using the positionable transmissive displays of the invention such as to allow a clock radio to display the time when the transmissive display is in one position and to display image data (e.g., a video or still image) when the transmissive display is moved into the projection assembly between the projection light source and projection lenses. In many cases, the projection aspects/functionality of the invention may be provided at very low cost as the assemblies or products may be created using conventional, relatively low cost and low resolution LCDs and readily available light sources (e.g., LEDs including those with up to 150 lumens or more of power) and projection lenses (e.g., plastic or glass lenses that can focus the image on projection surfaces a few inches to a several feet away). Often, the modification of existing devices may include mainly external modifications as the projection assembly can be mounted on external surfaces without altering internal components and/or dimensions.

More particularly, a ca era-projector assembly is provided that includes a camera housing and an image capture assembly within the housing that operates to collect image data. The camera-projector assembly also includes a projection assembly mounted on the camera housing that includes a projection lens and a projection light source. A transmissive display such as an LCD is provided external to the camera housing and adapted to be positionable in a first position proximate to the camera housing and in a second position between the projection lens and light source. The transmissive display may be operated to display the image data in the first and second positions. The transmissive display may be positioned with one of its surfaces against or abutting an external surface of the camera housing when it is in the first position and at least partially spaced apart from the external surface in the second position. For example, the transmissive display may be rotatably mounted on an external surface of the camera housing and be rotatable from the first to the second position about one of its ends or edges. In some cases, the transmissive display directs the displayed image data in a first direction when in the near-view or first position and in a second direction opposite or different than the first direction when in the projection or second position. The projection light source may be a relatively high powered source such as an LED of about 150 lumens or more while a backlight source may be provided for displaying the image data in the first position that is of a lower power (e.g., less than about 150 lumens).

According to another aspect, a consumer device or apparatus is provided that is operable to project an image onto a projection surface. The device includes a housing and memory disposed or receivable within the housing storing image data. A controller may be disposed within the housing and coupled to the memory to retrieve the image data. The device may further include a projection assembly coupled to/controlled by the controller. The projection assembly includes a projection light source, a transmissive display, and projection optics. The transmissive display is operable by the controller to display the image data and is also selectively positionable between the projection light source and the projection optics. In some cases, the transmissive display may include an LCD that is selectively positioned in a near-viewing mode position in which the LCD is spaced apart from the projection light source and a projection mode position in which the LCD is positioned between the projection light source and the projection optics.

In some cases, the transmissive display is rotatable about an axis that extends substantially along an edge of the transmissive display while in other cases the display may be slid between the two positions. The projection assembly may be affixed to an external surface of the housing. In some embodiments, the projection light source is also movable such as an LED that can be moved out of the way to allow free movement of the LCD and then placed on the back surface of the LCD to direct light through the images generated in the LCD to project these images onto a projection surface, which may be spaced apart from the housing (e.g., a few inches to several feet such as for a clock apparatus or the like) or within the housing such as for a handheld toy with images displayed within the housing viewable through windows or view ports. In some handheld projector devices, the transmissive device is selectively removable and insertable into the consumer device such as a modular display device (e.g., a keychain or similar product) with an LCD that can be placed into or used by the projection assembly (e.g., a modular display device with a transparent/translucent body and/or a rotatable LCD).

BRIEF DESCRIPTION OF THE DRAWINGS

FIGS. 4A-4B illustrate an embodiment of an exemplary consumer device that includes a transmissive display and projector.

FIGS. 9A-9C illustrate another embodiment of an exemplary camera-projector.

DETAILED DESCRIPTION

Figure 1:
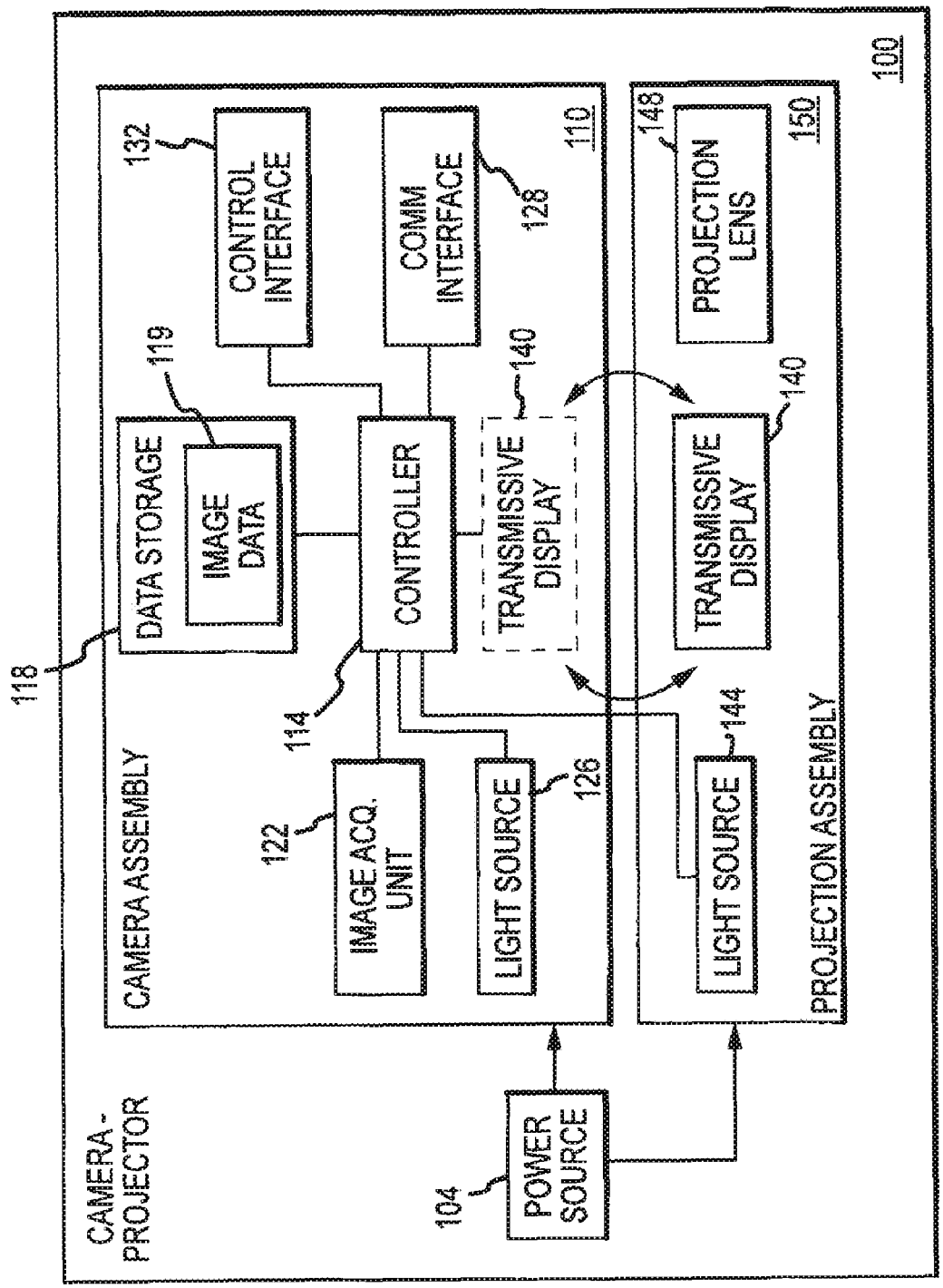
FIG. 1 illustrates a block diagram of an exemplary caera-projector.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Referring to FIG. 1, a block diagram of a camera-projector (or image capture device) 100 is shown. The camera-projector 100 includes a camera assembly 110 and a projection assembly 150. The camera-projector 100 also includes a power source 104 that is operable to provide power to the camera assembly 110 and the projection assembly 15. The power source 104 may include a battery, a power supply, an external interface, and other mechanisms associated with powering consumer devices such as digital cameras and is typically located in the camera-projector 100 housing or body.

The camera assembly 110 includes an image acquisition unit 122 that is operable to acquire image data 119 and convert the image data 119 to a digital signal, either alone or in conjunction with a separate analog-to-digital converter. The image acquisition unit 122 may typically include one or more lenses, a diaphragm, and an image sensor that converts optical images into electrical signals. For example, the image sensor may be a charge coupled device (CCD) or a complementary metal oxide semiconductor (CMOS) chip. The image acquisition unit 122 may be coupled to a controller 114, which is adapted to receive signals from the image acquisition unit 122 and to control the operation of the camera-projector 100. The controller 114 is typically a logic unit such as an application-specific integrated circuit (ASIC), a microprocessor, a field programmable gate array (FPGA), or the like. The controller 114 may also be coupled to a storage unit 118, which is adapted to store image data 119 captured by the image acquisition unit 122. The storage unit 118 may be fixed or removable. For example, a fixed storage unit may typically include a hard drive, internal flash memory, or other fixed memory device. A removable storage unit may include a removable disk, flash memory, a proprietary device, or other removable media. The camera assembly 110 may also include a communications interface 128 that is coupled to the controller 114, allowing for contact with an external information handling system. The external information handling system may typically include a personal computer, an internet device, a personal digital assistant, or any other device adapted to store and process information. The communications interface 128 may include an interface circuit or modem adapter to transfer image data from the storage unit 118 to the external information handling system. For example, the communications interface 128 may include a Universal Serial Bus (USB)

interface, a wireless interface, or one or more other suitable communications interfaces. The camera assembly 110 also may include a control interface 132 to provide users with a means to operate the camera-projector 100. As an example, the control interface 132 may include a plurality of buttons, knobs, and dials that enable a user to capture and review image data 119 stored on the camera-projector 100.

The camera assembly 110 of the camera-projector 100 and may also include a transmissive display or screen 140 that is coupled to the controller 114 for displaying the images stored in the storage unit 118. The transmissive display 140 may be, for example, an LCD device or screen. Such LCD devices include ferroelectric, nematic, anti-ferroelectric, and other liquid crystal materials. Because it is generally well known in the art of LCD devices how to create useful displays using such devices, the various optical components, such as polarizers, and analyzers, will not be described in detail herein. In addition to the crystal display devices, other suitable transmissive displays may be used. The display 140 may be positioned on an external surface of the camera body.

To provide backlighting for the transmissive display 140, a backlight 126 may also be included in the camera assembly 110. The backlight 126 may be internal or external to the body of the camera-projector 100, and is generally disposed directly behind the display 140. The backlight 126 may, for example, include one or more light emitting diodes (LEDs). The backlight 126 may further include means for conditioning light to provide a proper backlight. For example, the backlight 126 may include a light diffuser, a filter, one or more lenses, or the like.

To operate the camera-projector 100, a user may point the camera-projector 100 toward an object desired to be captured. Using the control interface 132 and while viewing the transmissive display 140, the user may then cause the image acquisition unit 122 to capture an image. The captured image may then be stored in the storage unit 118 as image data 119, and subsequently displayed on the transmissive display 140. In this regard, the user may playback a plurality of images that have been captured by the camera-projector 100.

The camera-projector 100 also includes the projection assembly 150. As illustrated in FIG. 1, the projection assembly 150 shares the transmissive display 140 with the camera assembly 110, such that the transmissive display 140 may be used in a near-viewing mode as shown with dashed lines in FIG. 1, where the display 140 is typically positioned on or against the body of camera-projector 100 and adjacent to the backlight 126, and in a projection mode shown with solid lines in FIG. 1 with display 140 positioned or disposed between projection light source 144 and projection lens 148 (which is typically positioned adjacent or "downstream" of a viewing or external surface of the LCD or other display 140 while the light source 144 is adjacent a back or internal surface of the LCD or display 140). The projection assembly 150 also includes a projection light source 144 (e.g., an LED) that is coupled to the controller 114, as well as a projection lens 148. To provide sufficient power to project images onto a projection surface, the projection light source 144 may be considerably more powerful than the backlight 126. As an example, the projection light source 144 may have a power that is in the range of about 150 to 400 lumens.

To achieve the aforementioned sharing of the transmissive display 140, the display 140 may be selectively positionable. For example, the transmissive display 140 may be slidable from a first configuration within the camera assembly 110 to a second configuration within the projection assembly 150. It should be appreciated that there are various ways of sharing the transmissive display 140 between the camera assembly 110 and the projection assembly 150. For example, the transmissive display 140 may be rotated about an axis from a first configuration to a second configuration. Further, the display 140 may be selectively movable between a local display position proximate to the body of the camera-projector 100 to a projection position distal or spaced apart from the body of the camera-projector 100. Additionally, other components such as the projection light source 144, the backlight 126, and the projection lens 148, may be selectively movable to achieve the desired sharing functionality.

When the camera-projector 100 is in the projection mode, the transmissive display 140 may be positioned between the projection light source 144 and the projection lens 148 of the projection assembly 150, as shown. In this regard, the controller 114 may direct the projection light source 144 to provide a backlight for the transmissive display 140. The light transmitted through the transmissive display will then pass to the projection lens 148, where it may then be projected onto a projection surface, such as a wall, ceiling, projection screen, or other suitable surface. It should be appreciated that the projection light source 144 may include ways for conditioning light into a form that is usable by the projection assembly 150. For example, the projection light source 144 may include filters, diffusers, collimators, or the like to achieve the desired backlighting. Further, the projection lens 148 may include one or more lenses, manual or automatic focusing means, or other features to assist in the projection of an image onto a projection surface.

Figure 2A:
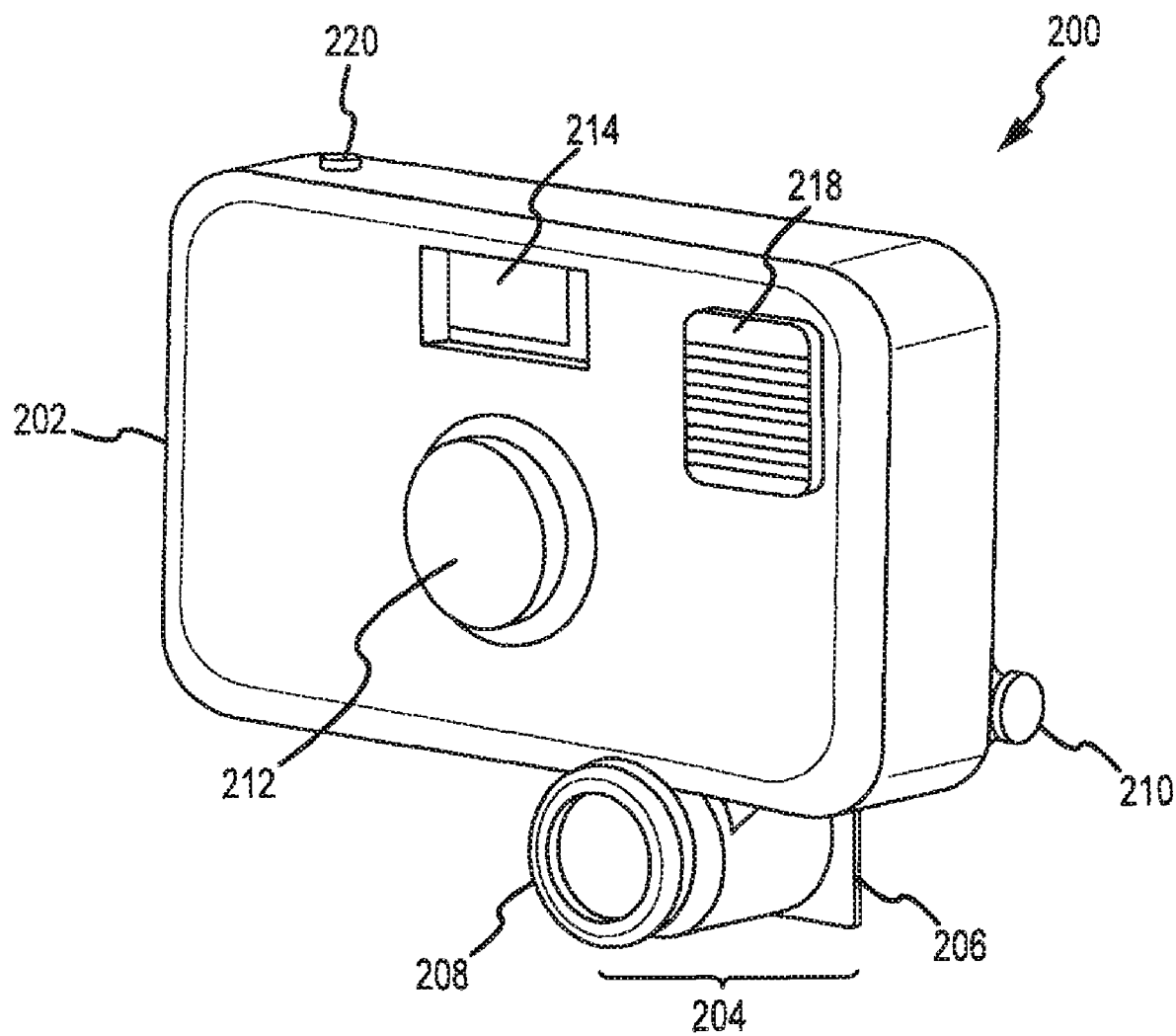
FIGS. 2A-2E illustrate an embodiment of an exemplary camera-projector.

FIGS. 2A-2E illustrate various views of an exemplary camera-projector 200. Referring to FIG. 2A, the camera-projector 200 includes a housing 202 that includes a camera lens assembly 212. The camera lens assembly 212 is used by the camera-projector 200 to capture images. The housing 202 also includes a front viewing port 214 that enables a user to approximate the boundaries of the image to be captured. The housing 202 may also include a flash device 218 that is operable to temporarily increase the lighting of the scene that is being captured. The housing 202 further includes an image capture button 220 for controlling the image capture function of the camera-projector 200. The camera-projector 200 also has a projection assembly 204 that includes a projection lens 208, an LCD 206, an LED 222 (shown in FIG. 2C), and an LED arm 224 (shown in FIG. 2C).

Figure 2B:
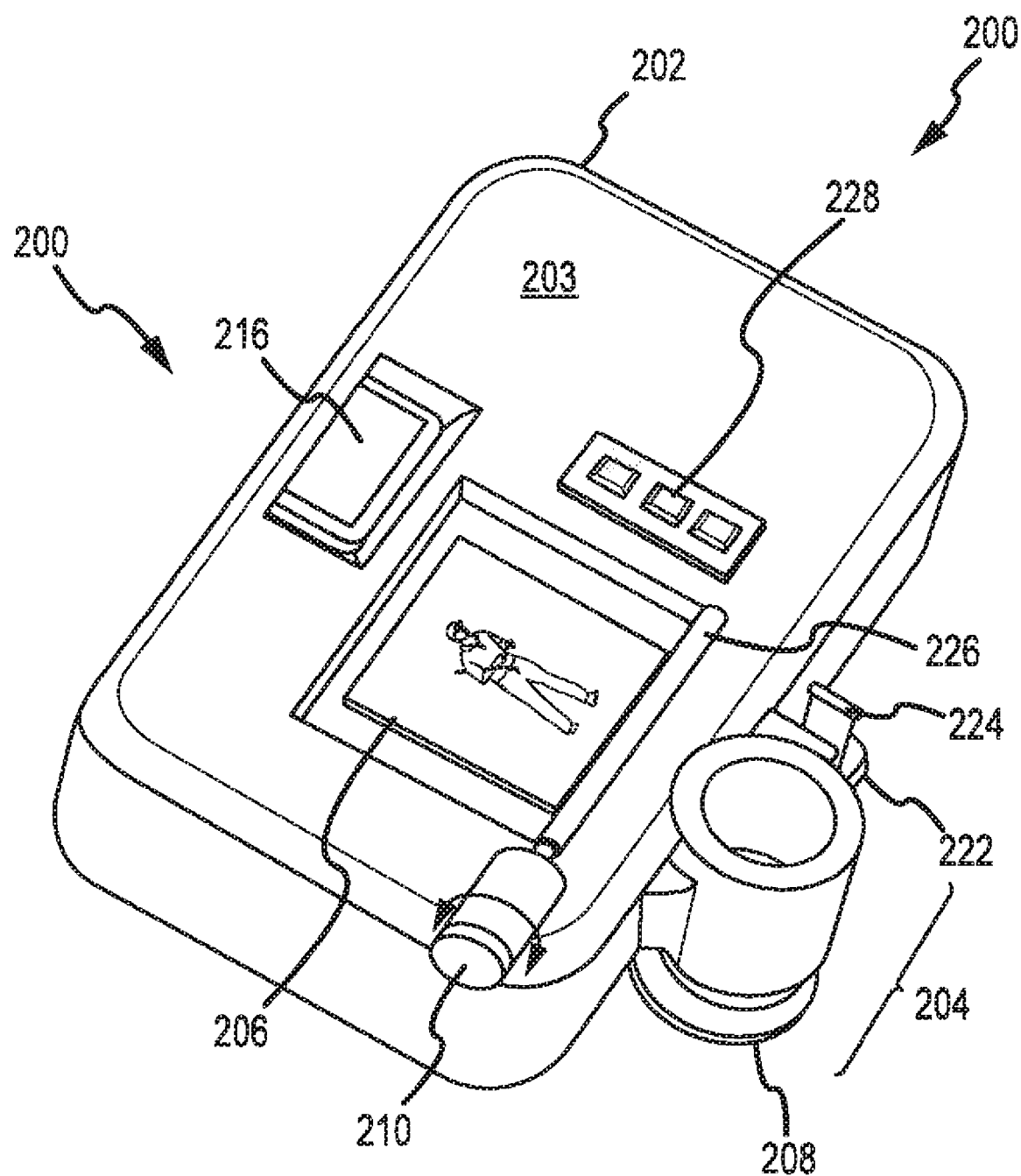
Figure 2C:
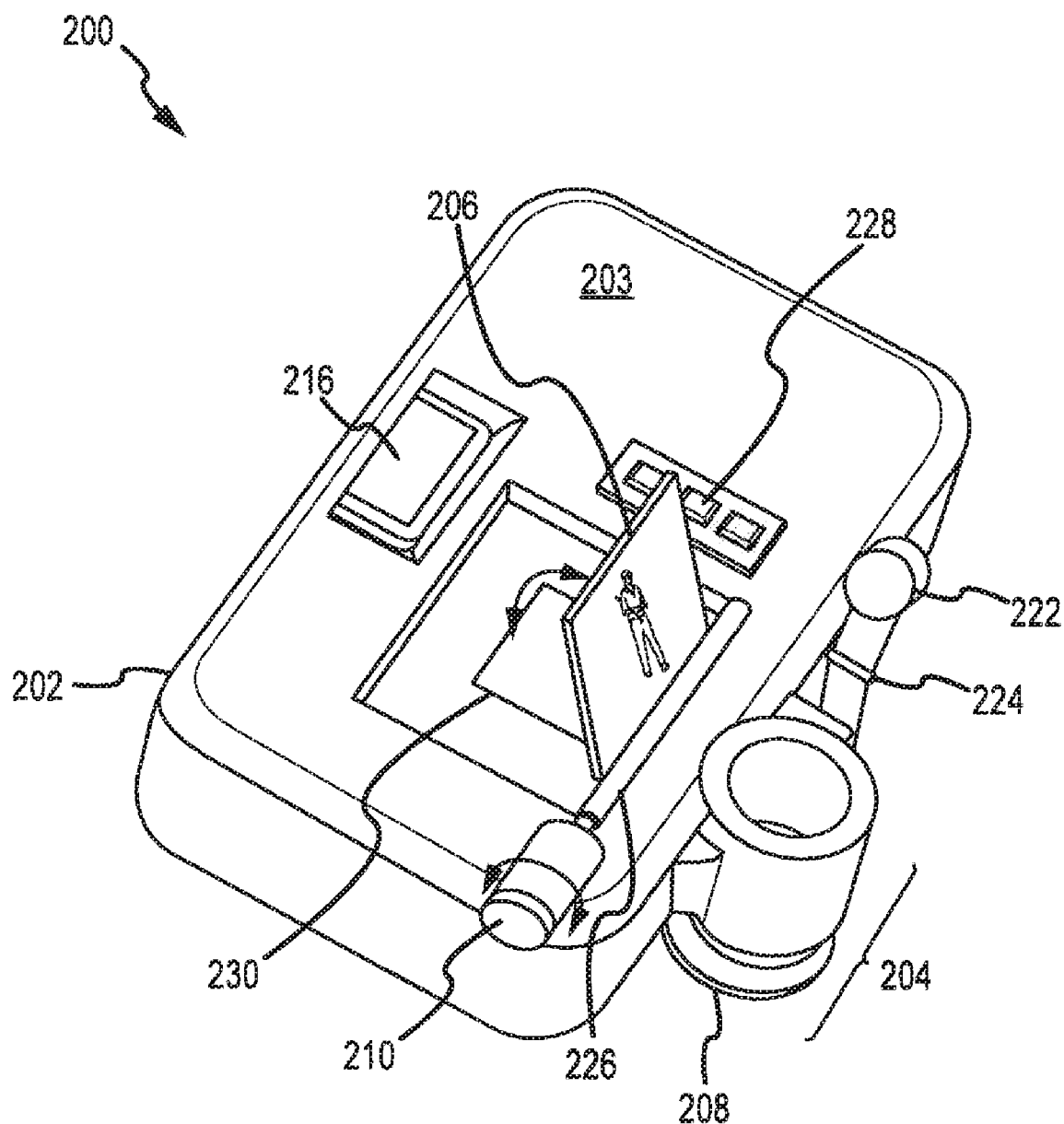
Figure 2D:
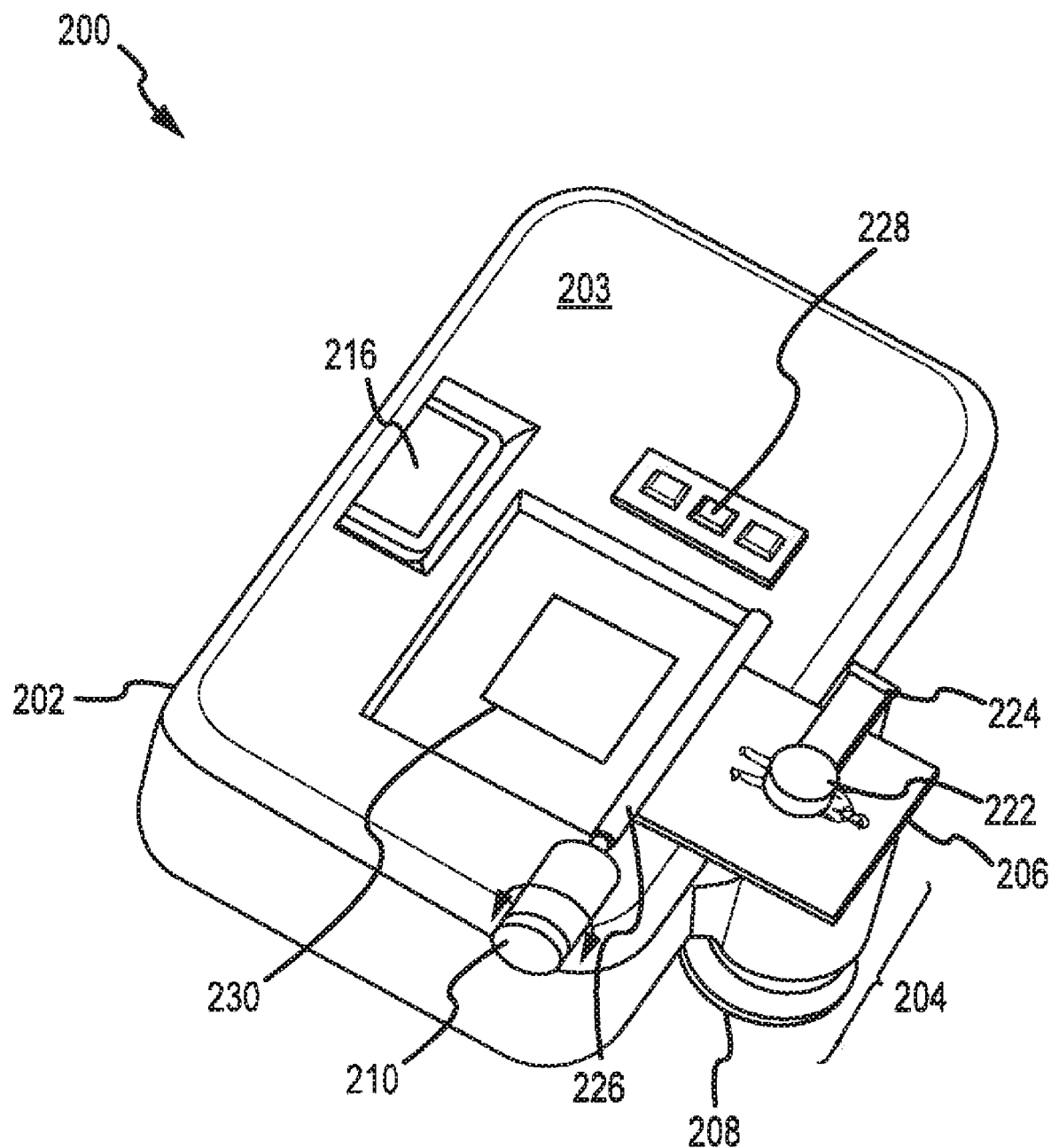

FIGS. 2B-2D generally illustrate the operation of the camera-projector 200 including selective positioning or movement (manual or automated in response to an operating mode control button/switch) between the near-viewing mode and the projection mode. FIG. 2B illustrates the camera-projector 200 when in the near-viewing mode. As shown, the back or external surface 203 of the housing 202 includes a rear viewing port 216, control buttons 228, and the LCD 206 returned from a projection mode position shown in FIG. 2A to a local display position abutting or proximate to an external surface 203 of the housing 202. When in the near-viewing mode, the LCD 206 is positioned adjacent or on the surface 203 of the housing 202, and illuminated by a backlight 230 (shown in FIGS. 2C and 2D) so that a user may view images captured and stored by the storage unit (not shown) of the camera-projector 200. As shown the LCD 206 is coupled to the housing 202 by a hinge mechanism 226. Further, a knob 210 is coupled to the hinge mechanism 226 to permit a user to selectively rotate the LCD 206 from a near-viewing mode configuration (shown in FIG. 2B) to a projection mode configuration (shown in FIG. 2D). As shown in FIG. 2D, the LCD 206 is spaced apart from the back 203 of lie housing 202 (or apart from its original near-view mode position and/or backlight 230 such as by rotating 45 to 315 degrees from the near-view mode position or more typically about 90 to 180 degrees about the mounting or rotation pin/axis) when in the projection mode position. To provide communication between the LCD 206 and internal circuitry of the camera-projector 200 (e.g., a controller, such as the controller 114 shown in FIG. 1), a flexible circuit may be routed through a portion of the hinge mechanism 226 between the LCD 206 and the internal circuitry. Additionally, various restraints (not shown) may be included to secure the LCD 206 in both the near-viewing mode position and the projection mode position.

FIG. 2C is an illustration of the camera-projector 200 during a transition between the near-viewing mode and the projection mode. As shown, a user may manually rotate the knob 210 causing the LCD 206 to rotate toward the projection assembly 204. Alternatively, the LCD 206 may be automatically rotated by a mechanism (not shown) in the camera-projector 200 in response to a request by the user (e.g., by pressing one or more of the control buttons 228). Additionally, an LED 222 (or other projection light source) is coupled to an LED arm 224 and may be positioned adjacent to the back of the LCD 206 after the LCD has been rotated and positioned against the projection lens 208, as shown in FIG. 2D. The LED arm 224 may include a hinge mechanism to provide the proper positioning of the LED 222 relative to the LCD 206. As shown in FIG. 2D, the projection assembly 204 is attached to an external surface of the housing 202 of the camera-projector 200, and includes the projection lens 208, the LCD 206, and the LED 222.

It should be appreciated that the LED 222 may include various properties that are desirable for this specific application. For example, the viewing angle of the LED 222 with an integral lens may be wide (e.g., 100-160 degrees) so that the light is distributed evenly over a large portion of the back of the LCD 206. Further, the brightness of the LED may be chosen to provide sufficient backlighting to project an image through the projection lens 208 and onto a projection surface. In one embodiment, the LED 206 has an intensity in the range of about 150 to 400 lumens to overcome the relatively large loss of light in the LCD 206.

As can be seen in FIG. 2D, the image on the LCD 206 is upside down in the projection mode relative to the near-viewing mode, due to the rotation of the LCD 206 about and axis that extends along the hinge mechanism 226. To compensate for this, the projection lens 208 may invert the image so that the projected image is displayed correctly on a projection surface. Additionally or alternatively, image control techniques (e.g., circuitry or software) inside the camera-projector 200 may be operable to modify the image on the LCD 206 when the camera-projector 200 is in the projection mode. As an example, an image control technique may invert the image, resize the image, or otherwise alter the image displayed on the LCD 206 when the camera-projector 200 is in the projection mode.

Figure 2E:
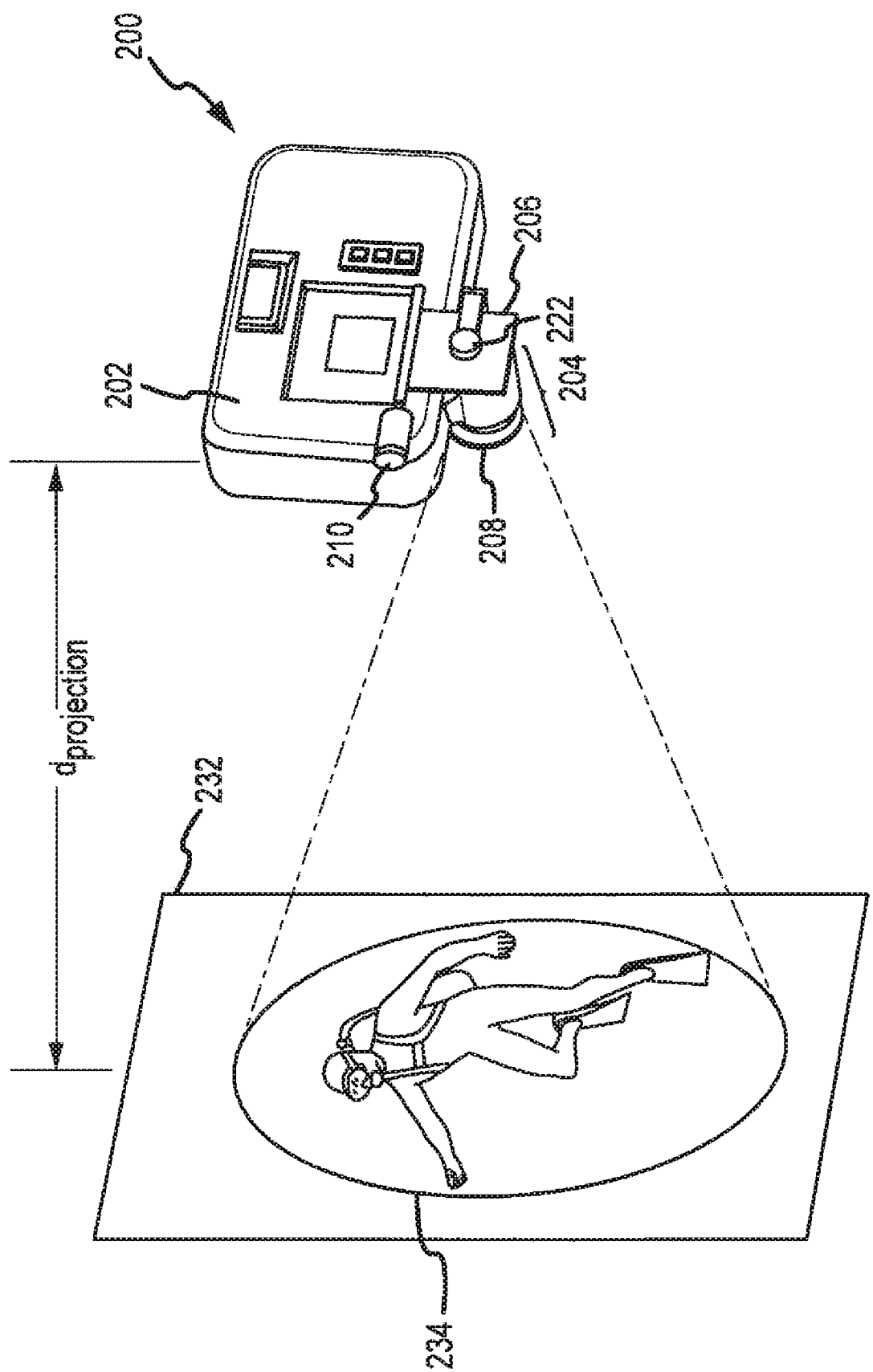

FIG. 2E illustrates the operation of the camera-projector 200 in projection mode. As shown, the LCD 206 has been positioned between the LED 222 and the projection lens 208. In projection mode a user may point the projection lens 208 in the direction of a projection surface 232 (e.g., a wall, a ceiling, a screen, etc.). A projected image 234 may then be displayed on the projector surface 232 (e.g., a wall, ceiling, screen, etc.) that is a distance ($d_{projection}$) away from the camera-projector 200 so that multiple users may simultaneously view the image or video played back from the camera-projector 200. The distance ($d_{projection}$) that an image may be projected may vary depending on various factors that include focusing ability, ambient lighting conditions, power of the projection light source 222, and the like. In one embodiment, the camera-projector 200 is operative to display images on the projector surface 232 at a maximum distance ($d_{projection}$) of up to about 5 to 20 feet.

Figure 3:
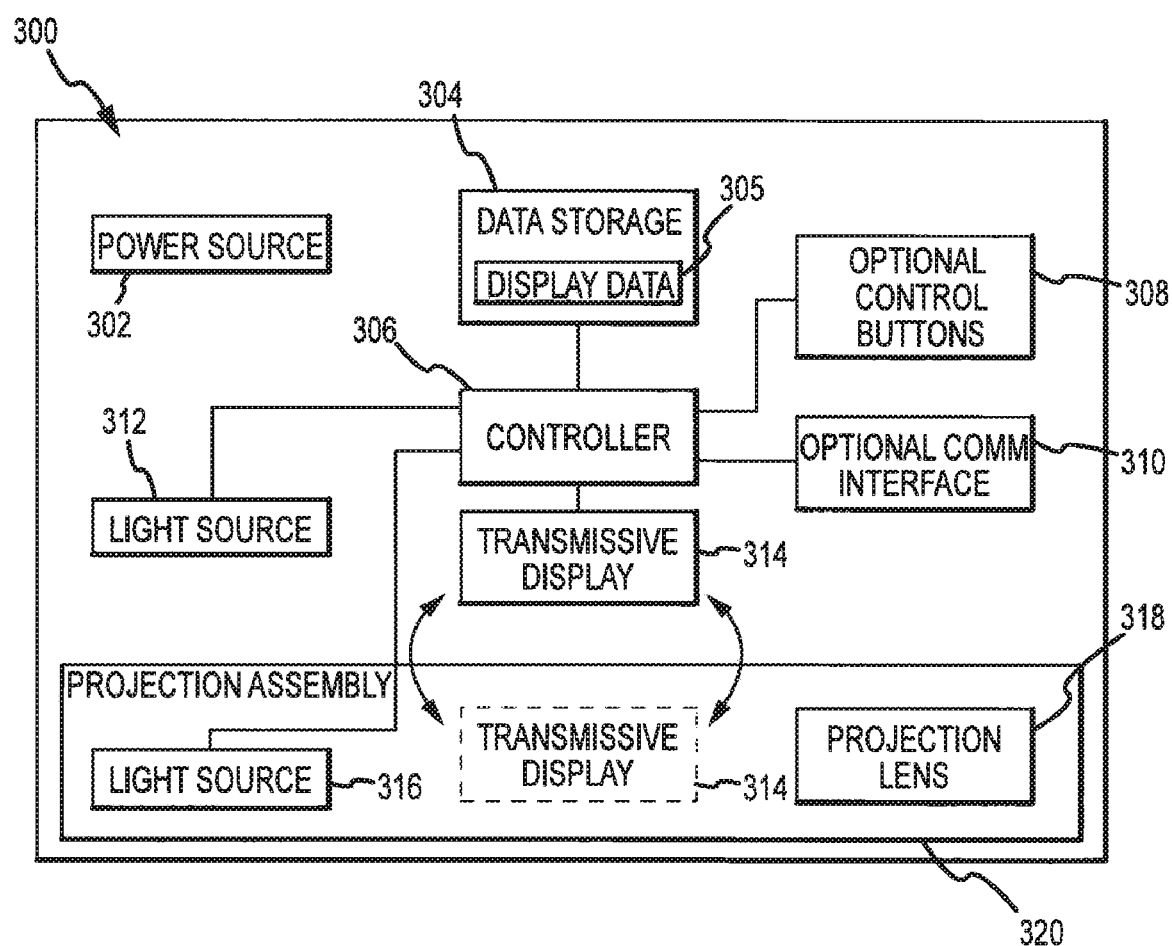
FIG. 3 illustrates a block diagram of an exemplary consumer device that includes a transmissive display and projector.

FIG. 3 illustrates a block diagram of a consumer device 300 (e.g., a toy, a clock radio, a lamp, or the like) that includes dual mode display-projection features of the present invention. The device 300 includes a transmissive display 314 that is adapted to operate in a near-viewing mode and a projection mode (or in first and second positions). The device 300 may include a controller 306 coupled to the transmissive display 314. Additionally the device 300 may include a storage unit 304 that is operable to store data 305 (e.g. images, video, or other display media) to be displayed on the transmissive display 314. The device 300 may also include optional control buttons 308 for enabling a user to control the operation of the device 300. Additionally, the device 300 may include an optional communication interface 310 to provide communication between the device 310 and an external information handling system, such as a computer, so that display media may be transferred to and from the device 300. Further the device 300 may include a power source 302 to provide power to the various components of the device 300.

When the device 300 is operated in near-viewing mode, the controller 306 may cause a backlight 312 to provide illumination for the transmissive display 314. Further, when the device 300 is operated in a projection mode, the transmissive display 314 may be selectively positioned within a projection assembly 320. The projection assembly 320 may include a projection light source 316, the transmissive display 314, and a projection lens 318. Similar to the operation described above in reference to FIG. 1, the projection light source 316 provides illumination for the transmissive display 314, and the light passes through the projector lens 318 and onto a projection surface that is near the device 300.

FIGS. 4A-4B illustrate an alarm clock 400 that includes an LCD 406 that may be positionable between a near-viewing mode, shown in FIG. 4A, and a projection mode, shown in FIG. 4B. In FIG. 4A, the LCD 406 is positioned external and adjacent to a housing 402 of the alarm clock 400, and is configured to display the current time. A backlight 422 (shown in FIG. 4B) may be used to provide backlighting for the LCD 406. The alarm clock 400 also includes a speaker 420, a projection assembly 418, and control buttons 408, 410.

Referring to FIG. 4B, a user may manually turn the knob 404 to rotate the LCD 406 from the near-viewing position to a projection mode position (with both positions typically being external to the housing 402). Alternatively, the alarm clock 400 may include a mechanism for automatically positioning the LCD 406 in the first and second positions. The operation of the projection assembly 418 is similar to the projection assembly 204 shown in FIGS. 2A-2E. In this regard, the projection assembly includes a projection lens 416, an LED arm 424, and an LED 414. Once the LCD 406 has been rotated into the projection position, the LED 414 may be positioned directly behind the LCD 406 to provide a backlight, such that the image displayed on the LCD 406 is projected through the projection lens 416 and onto a projection surface 428 (e.g., a wall, ceiling, etc.), creating a projection image 426.

It should be appreciated that the alarm clock 400 may use the projection assembly 418 and the speaker 420 to implement various features. For example, in one embodiment the alarm clock 400 may be configured to display a slide show of images accompanied by music. In another embodiment, the alarm clock 400 may be configured to show a video. As an example, the alarm clock 400 may be operable to play a video that includes music that is helpful in getting a child to fall asleep at night. Those skilled in the art will readily recognize that other features may be implemented using the projection assembly 418 described herein.

Figure 5:
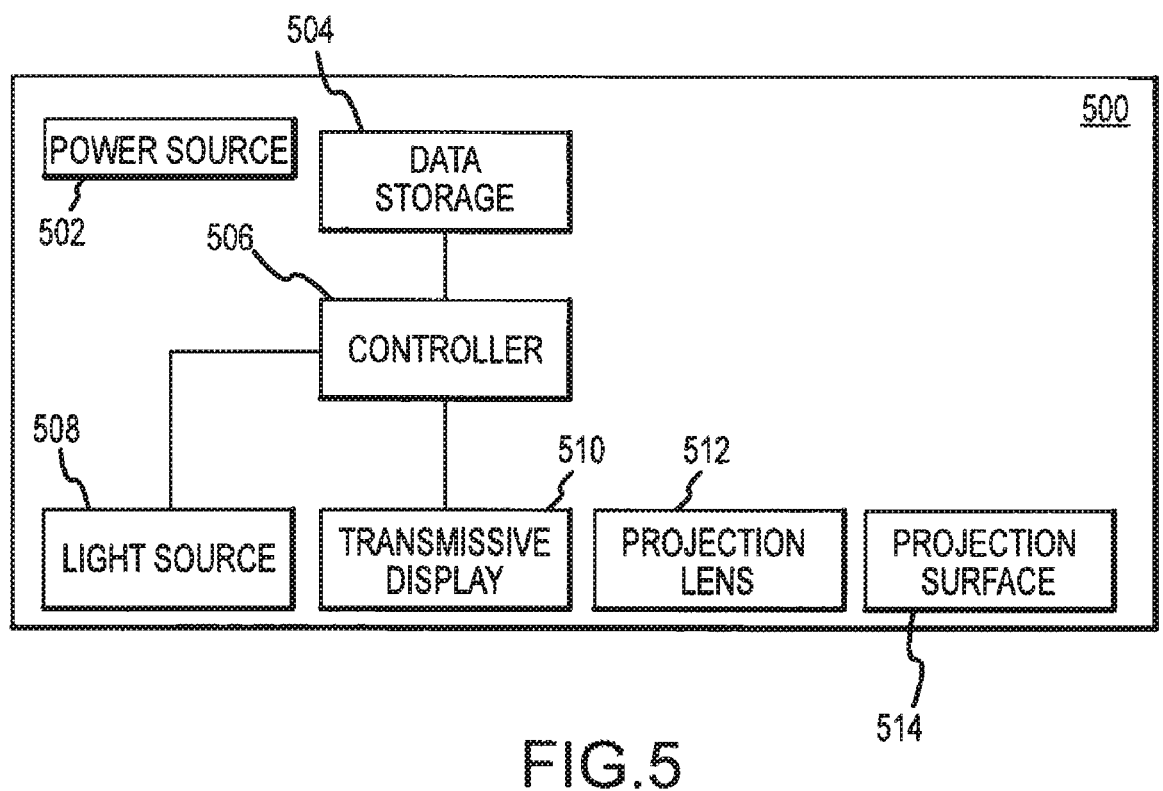
FIG. 5 illustrates a block diagram of another embodiment of a consumer device.

FIG. 5 illustrates a block diagram of a consumer device 500 (e.g., a toy, an ornament, or the like) that includes a projector assembly (i.e., a projection light source 508, a transmissive display 510, and a projection lens 512) and a projection surface 514. The device 500 may include a controller 506 that is coupled to a storage unit 504 for storing images to be displayed. In operation, the controller 506 may be operable to retrieve an image from the storage unit 504 and to cause the image to be displayed on the transmissive display 510. The controller 506 may also enable the projection light source 508 to provide a backlight for the display 510, so that light may pass through the display 510, through the projection lens 512, and onto the projection surface 514. The projection surface 514 may be any suitable surface, such as clear or opaque plastic. Further, the projection surface 514 may be shaped and sized to achieve a desired effect. The device also includes a power source 502 that is operable to provide power to the various components of the device 500. Similar to the device 300 shown in FIG. 3, the device 500 may include various control and communications interfaces that are suitable for the particular application.

Figure 6:
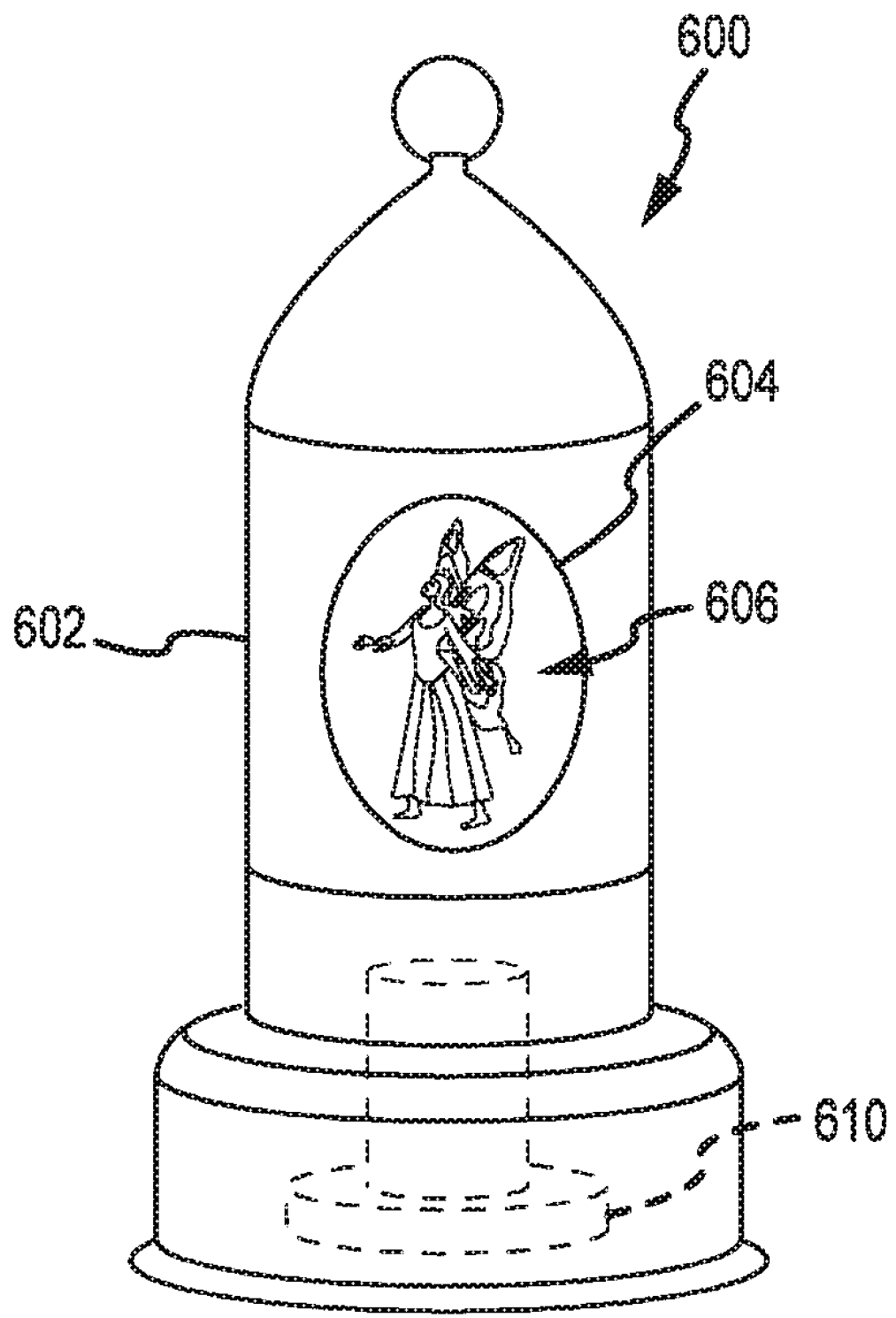
FIG. 6 illustrates a toy that includes a projector and a projection surface.

FIG. 6 illustrates an exemplary children's toy 600 that includes a built-in projector assembly 610 and a projection surface 604. Generally, the toy 600 includes a housing 602 that may include the various components shown in the device 500 of FIG. 5. The toy 600 further includes the projection surface 604 that enables the internal projection assembly to display a projected image 606. The toy 600 may be operable to display a single image, multiple images, or video. Further the toy 600 may include one or more speakers for providing audio features. The toy 600 may also include various control means to enable users to control its operation. For example, the toy 600 may include buttons that enable a user to turn the toy 600 on and off, or to select various images to be displayed on the projection surface 604.

Similar to previously described embodiments, the projection assembly 610 may include a projection light source (not shown) for projecting an image onto the projection surface 604. Further, in one embodiment, the transmissive display (not shown) of the projection assembly 610 may be selectively positionable (e.g., rotatable, slidable, etc.) between a projection mode position and a near-viewing mod position. In this regard, the toy 600 may include a backlight (not shown) to illuminate the transmissive display when it is in the near-viewing mode.

Figure 7:
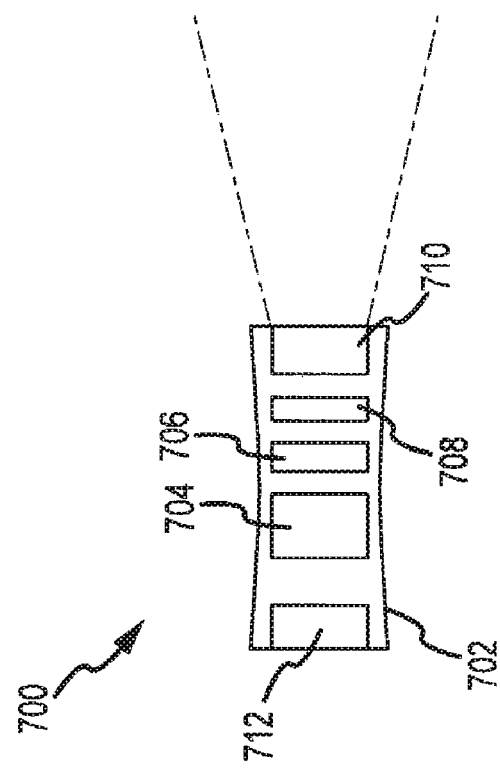
FIG. 7 illustrates an embodiment of a portable projection device

FIG. 7 illustrates a portable projection device 700 that is operable to utilize a similar projection assembly to those previously described embodiments of the present invention. A power source 712 (e.g., a battery), a projection assembly that includes a projection light source 704, a light conditioning assembly 706, a transmissive display 708, and a projection lens 710 are disposed inside a housing 702 of the projection device 700. The projection device 700 may be sized such that users may operate the device 700 in their hand. For example the total volume of the device 700 may be less than 10 cubic inches, more preferably less than 3 cubic inches. The device may further include control means, a wired or wireless communication interface, focusing means, or other features that may be desirable. For example, the device 700 may include fixed or removable memory (not shown) coupled to a controller (not shown) to provide images to the transmissive display 708.

Figure 8:
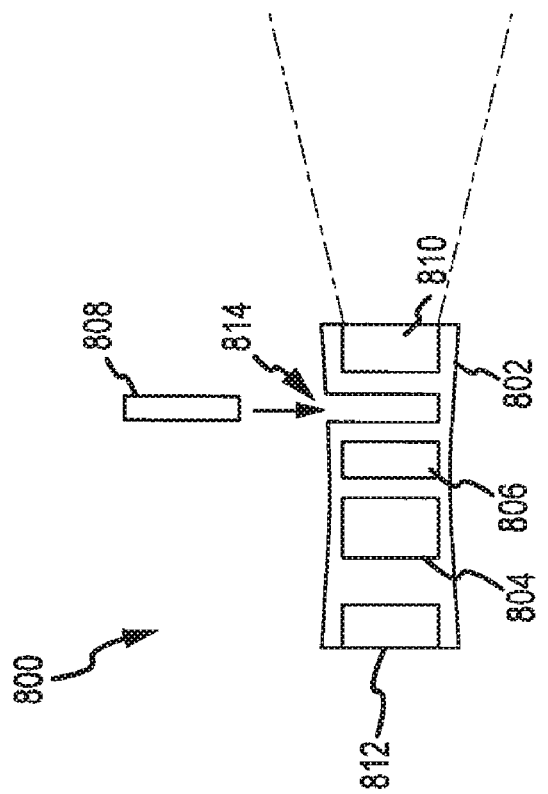
FIG. 8 illustrates another embodiment of a portable projection device.

FIG. 8 illustrates a portable projection device 800. The device 800 is similar to the device 700 shown in FIG. 7, in that it includes a housing 802, a power source 812, and a projection assembly that includes a projection light source 804, a lens assembly 806, and a projection lens 810. However, the device 800 includes a slot 814 that is shaped to receive an external transmissive display 808. In this regard, the device 800 may be configured to utilize available or customized transmissive displays to provide the images for use in projecting images. For example, the transmissive display 808 may be a small LCD device that enables users to view images. The portable projection device 800 may be configured to receive the LCD and project the images displayed onto a projection surface so that multiple users may simultaneously view them. In one embodiment, the LCD 808 is part of a digital picture viewer keychain. In this regard, users may download images onto the keychain, where the images may be subsequently displayed on the LCD. The device 800 may be adapted to receive the keychain into the slot 814, such that the LCD of the keychain may serve as the transmissive display for the projection device 800. In this regard, the digital images stored on the keychain may then be projected onto a projection surface (e.g., a wall, ceiling, screen, or the like) to be viewed by multiple persons.

In some cases, the keychain or modular LCD display device including LCD or display 808 is configured for insertion into the device 800 as a unit. A more conventional module LCD display device has a solid back opposite its LCD and a backlight internal to its housing. A modified embodiment of such a modular device may have its LCD 808 mounted on a front, external surface and the internal components may be arranged to allow projection light source 804 to project light unobstructed or relatively unobstructed onto the back of the LCD 808, and, of course, the back or rear wall of the display device would be at least translucent or partially translucent/transparent to allow light from the light source 804 to pass through to the LCD 808. In other embodiments, the light source 804 is replaced or supplemented with the light source/backlight in the modular display device. In this case, the light source may be a one power source or have two or more settings such as a near-view power level or luminance and a projection mode power level that provides a higher power level or luminance, with switching being manual or automatic such as with a switching mechanism responsive to insertion into the housing 802.

In other embodiments, the modular display such as a keychain/backpack clip configured such that the LCD or display 808 is rotatable or slidable or otherwise repositionabie from a near-view position adjacent the body of the module display to a projection position apart from the body. In this projection position (e.g., rotated 90 to 180 degrees about one hinged edge or the like as discussed with reference to the camera-projector of FIGS. 1-2E), the modular display body may be mounted onto a receiving mechanism (not shown) on the body/housing 802 such that the LCD/display 808 is inserted or disposed as shown in FIG. 8 between the projector light 804 and the projector lens 810 (e.g., inserted into the projection assembly 800 and its slot 814).

FIGS. 9A-9C illustrate various views of another exemplary camera-projector 900. Referring to FIG. 9A, the camera-projector 900 includes a housing 902 that includes a rear viewing port 916, control buttons 928, and an LCD 906 disposed on a back or external surface 903 of the housing 902 of the camera-projector 900. In the embodiment 900, the LCD 906 is not moved as is the case with some of the other embodiments but is instead maintained against the surface 903. When in a near-viewing mode, a light source such as an LED (not shown) illuminates the LCD 906 such that a user may view images or video stored in a memory storage unit of the camera-projector 900. The camera-projector 900 also includes a projection lens 908 (shown in FIGS. 9B and 9C) that is coupled to the camera-projector 900 via a hinge mechanism 926. As shown in FIGS. 9B and 9C, a user may rotate the projection lens 908 into an abutted relationship with the LCD 906 by turning a knob 910. In this configuration, the camera-projector 900 may be used to display images or video on a projection surface, such as a wall, projection screen, or the like. To achieve the projector functionality, the light source behind the LCD 906 may be adapted to operate in a relatively high-power mode (e.g., 150 lumens or more) when the projection lens 908 is positioned over the LCD 906. Alternatively, more than one light source may be positioned behind the LCD 906 to enable the camera-projector 200 to be operated in both near-viewing and projection viewing modes by switching between a low-power, near-viewing mode source and a high-power, projection mode source, such as by a user operating control buttons/switches 928.

Figure 10A:
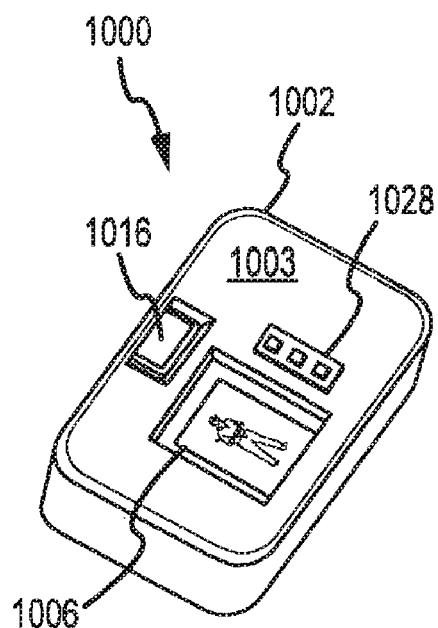
FIGS. 10A-10C illustrate another embodiment of an exemplary camera-projector.
Figure 10B:
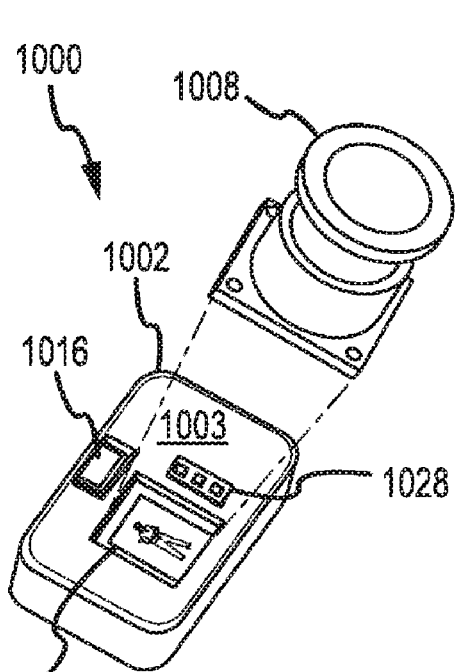
Figure 10C:
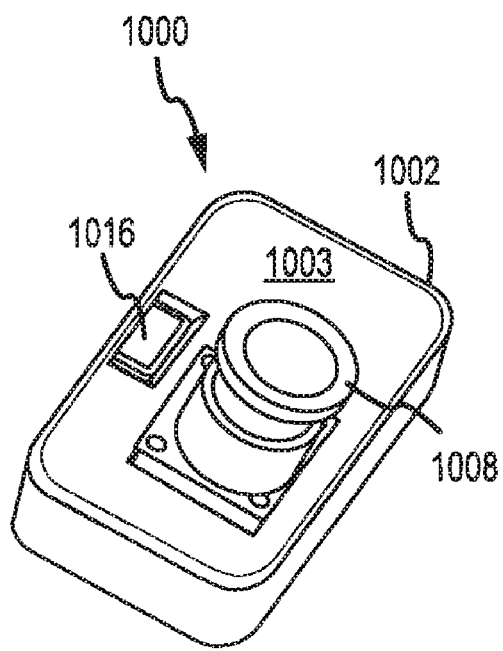

FIGS. 10A-10C illustrate various views of another exemplary camera-projector 1000. Similar to previously described embodiments, the camera-projector 1000 includes a rear viewing port 1016, control buttons 1028, and an LCD 1006 disposed on a back or external surface 1003 of the housing 1002 of the camera-projector 1000. In this embodiment, the surface 1003 is adapted to receive a detachable projection lens 1008, shown in FIGS. 10B and 10C. The projection lens 1008 may be coupled to the camera-projector 1000 by any suitable means. As an example, the projection lens 1008 may be attached to the camera-projector 1000 by slidably positioning one relative to the other. As another example, the camera-projector 1000 and the projection lens 1008 may be coupled together by a latch mechanism. Those skilled in the art should readily recognize that there are various ways for coupling the detachable projection lens 1008 to the camera-projector 1000 such as with a snap or interference fit between shoulders/edge elements on surface 1003 and a base member of lens assembly 1008, by sliding into a groove (not shown) in surface 1003, with hinged or movable restraints on surface to mate with base of lens 1008 (or vice versa), with threaded or other fasteners on base 1008 (such as the four restraints shown in FIG. 10C), or the like. When the projection lens 1008 is attached to the camera projector 1000 (shown in FIG. 10C), a light source (not shown) positioned behind the LCD 1006 may be adapted to provide relatively higher powered light (e.g., 150 lumens or more) to the LCD 1006 compared to when the camera-projector 1000 is in the near-viewing mode, so that images or video may be projected onto a projection surface (e.g., one or more light sources may be provided in camera housing 1002 behind the LCD 1006 for selective operation such as by a user operating control buttons 1028 or by an automated sensing of the placement of the projector lens 1008 against the surface 1003 or the like).

Figure 11A:
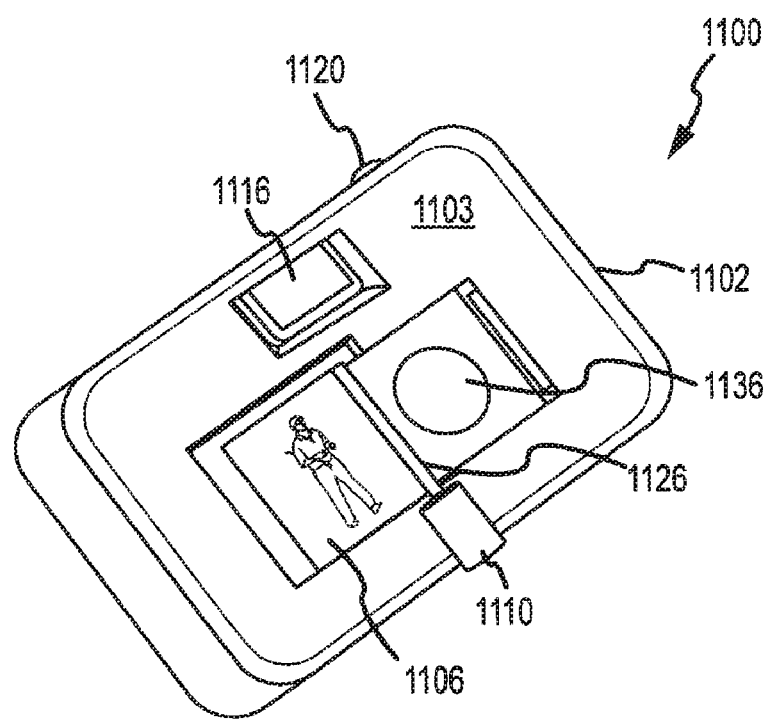
FIGS. 11A-11D illustrate another embodiment of an exemplary camera-projector.
Figure 11B:
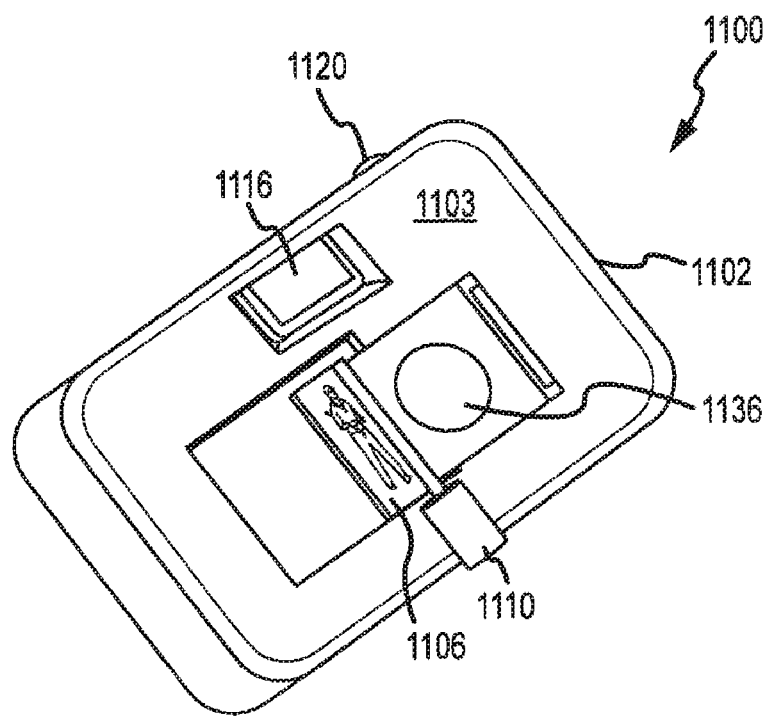
Figure 11C:
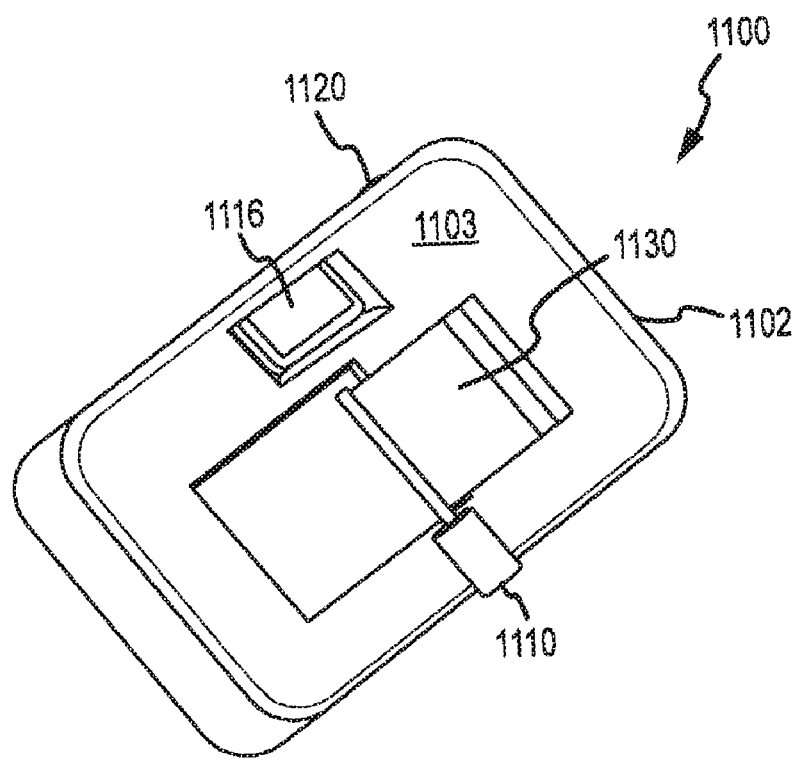
Figure 11D:
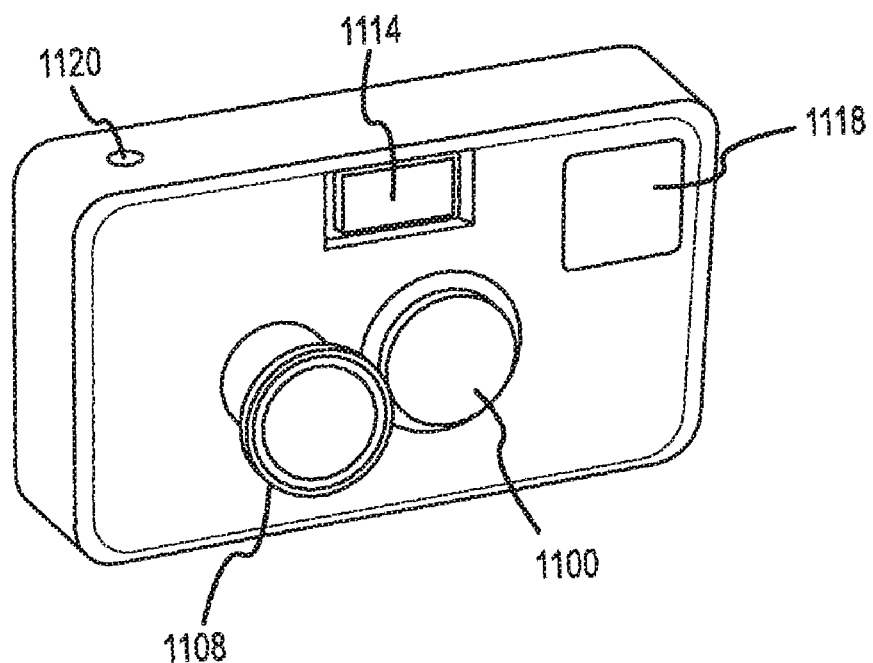

FIGS. 11A-11D illustrate various views of another exemplary camera-projector 1100. Similar to previously described embodiments, the camera-projector 1100 includes a rear viewing port 1116 and an LCD 1106 disposed (when the camera-projector 1100 is operated in a near-viewing mode) on a back or external surface 1103 of the housing 1102 of the camera-projector 1100. In this embodiment, an edge or side of the LCD 1106 is coupled to a hinge mechanism 1126, which in turn is coupled to a knob 1110. As shown in FIGS. 11B and 11C, a user may turn the knob 1110 and rotate the LCD 1106 from a near-viewing mode position shown in FIG. 11A to a projection mode position shown in FIGS. 11C and 11D.

As shown, a light source 1130 may be coupled to a back surface of the LCD 1106 such that the two are rotated together by the user. In this regard, the light source 1130 provides a backlight for the LCD 1106 in both a near-viewing mode and a projection mode. In the projection mode, light from the light source 1130 passes through an aperture 1136 in the camera-projector 1100 and through a projection lens 1108 (shown in FIG. 11D) that protrudes out a front surface of the camera-projector 1100. It should be appreciated that the projection lens 1108 may be disposed inside of or external (as shown) to the housing 1102 of the camera-projector 1100. Again, as with camera-projectors 900 and 1000, the light source 1130 may be operable at a single power or two or more user-selectable powers to support near-viewing and projection operating modes of the camera-projector 1100 (e.g., with one or more light sources such as LEDs that provide white and/or colored light). In each of the embodiments 900, 1000, 1100, the LCD or other transmissive display is provided on the outer surface of the camera body and the embodiments provide differing designs to place this LCD or other display within a projection assembly (e.g., differing techniques for positioning the LCD between a projection light source and a projection lens that make up parts of a projection assembly).

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

I claim:

1. A image capture device that is operable to display images in a near-viewing mode and a projection mode, said image capture device comprising:

a housing;

a transmissive display disposed on an external surface of said housing and said transmissive display being mounted to said housing with a first hinge mechanism, said transmissive display being operable to display images captured by said image capture device and being selectively movable via operation of the first hinge mechanism between a near-viewing mode position and a projection mode position;

projection optics for projecting an image onto a projection surface; and a projection light source, pivotally and externally mounted to the housing with a second hinge mechanism, for providing illumination through said transmissive display when said image capture device is in said projection mode position;

wherein said transmissive display and light source are separately rotated, via operation of the first and second hinge mechanisms, to the projection mode position with the transmissive display disposed between said projection optics and said projection light source, wherein said transmissive display is rotatable with the first hinge mechanism about an axis that extends substantially along an edge of said transmissive display to move the transmissive display between the near-viewing mode and projection mode positions, and wherein a back surface of said transmissive display is proximate to said housing when in said near-viewing mode position and wherein the back surface is at least partially spaced apart from said external surface of said housing when in said projection mode position.

2. The image capture device of claim 1, wherein said projection light source comprises a light emitting diode (LED).

3. The image capture device of claim 2, wherein said projection light source is selectively positionable adjacent to a back surface of the transmissive display.

4. The image capture device of claim 1, wherein said projection optics include a focusing mechanism to enable a user to focus an image on said projection surface.

5. The image capture device of claim 1, further comprising a backlight disposed inside of said housing for providing illumination for said transmissive display when in said near-viewing mode position.

6. The image capture device of claim 1, wherein said transmissive display comprises a liquid crystal display (LCD).

7. The image capture device of claim 1, wherein separate light sources provided with for use in projecting light directly through the transmissive display when the transmissive display is in the near-viewing mode position and in the projection mode position, whereby mirrored surface are not used to redirect light to the transmissive display.

8. A consumer device that is operable to project an image onto a projection surface, comprising:
a housing;
a controller disposed within said housing;
memory operable to store image data and accessible by the controller; and
a projection assembly including a projection light source, a transmissive display, and projection optics, wherein said transmissive display is operable by said controller to display said image data and wherein the transmissive display is selectively positionable between the projection light source and the projection optics,
wherein said transmissive display is selectively movable between a first near-viewing mode position and a second projection mode position, said first position being different from said second position and both the first and second positions are external to the housing,
wherein said transmissive display is rotatable via a first hinge mechanism about an axis that extends substantially along an edge of said transmissive display,
wherein said projection assembly is affixed to an external surface of said housing, and
wherein said projection light source is selectively positionable via a second hinge mechanism such that said transmissive display is located between the projection light source and the projection optics when the transmissive display is in the second position.

9. The consumer device of claim 8 wherein said transmissive display comprises a LCD and wherein the LCD is selectively positioned in a near-viewing mode position in which the LCD is spaced apart from the projection light source and a projection mode position in which the LCD is positioned between the projection light source and the projection optics.

10. The consumer device of claim 8, wherein said projection light source comprises an LED.

11. The consumer device of claim 8, wherein said projection optics includes a focusing mechanism to enable a user to focus an image on said projection surface.

12. The consumer device of claim 8, wherein said transmissive display is selectively removable from said consumer device.

13. The consumer device of claim 8, further comprising a projection surface spaced apart from the projection light source.

14. The consumer device of claim 13, wherein said projection surface is disposed within a housing of said consumer device.

15. The consumer device of claim 8, wherein said consumer device is further operable to generate audio output while projecting an image onto said projection surface.

16. A camera-projector assembly, comprising:
a camera housing;
an image capture assembly provided within the camera housing that operates to collect image data;
a projection assembly mounted on the camera housing including a projection lens and a projection light source pivotally mounted to the camera housing with a hinge mechanism;
a transmissive display external to the camera housing positionable in a first position proximate to the camera housing and a second position between the projection lens and the projection light source, wherein the transmissive display operates to display the image data in the first and second positions,
wherein the transmissive display comprises an LCD,
wherein the LCD is placed against an external surface of the camera housing in the first position and is at least partially spaced apart from the external surface in the second position,
wherein the transmissive display is rotatably mounted, with a manual or automated hinge assembly, on an external surface of the camera housing and is rotatable from the first position to the second position about an edge of the transmissive display, and
wherein the projection light source is rotatable from a first to a second position by operation of the hinge mechanism, the transmissive display being sandwiched between the projection lens and the projection light source with the projection light source in the second position.

17. The assembly of claim 16, wherein the transmissive display directs the displayed image data in a first direction when in the first position and in a second direction opposite the first direction when in the second position.

18. The assembly of claim 16, wherein the projection light source has a power of at least about 150 lumens and the assembly further comprises a backlight positioned in the camera housing to direct light through the transmissive display when the transmissive display is in the first position, the backlight having a power less than about 150 lumens.

* * * * *